Aug. 29, 1933.  H. C. EDWARDS  1,924,843
INTERNAL COMBUSTION ENGINE
Filed Nov. 21, 1930  3 Sheets-Sheet 1
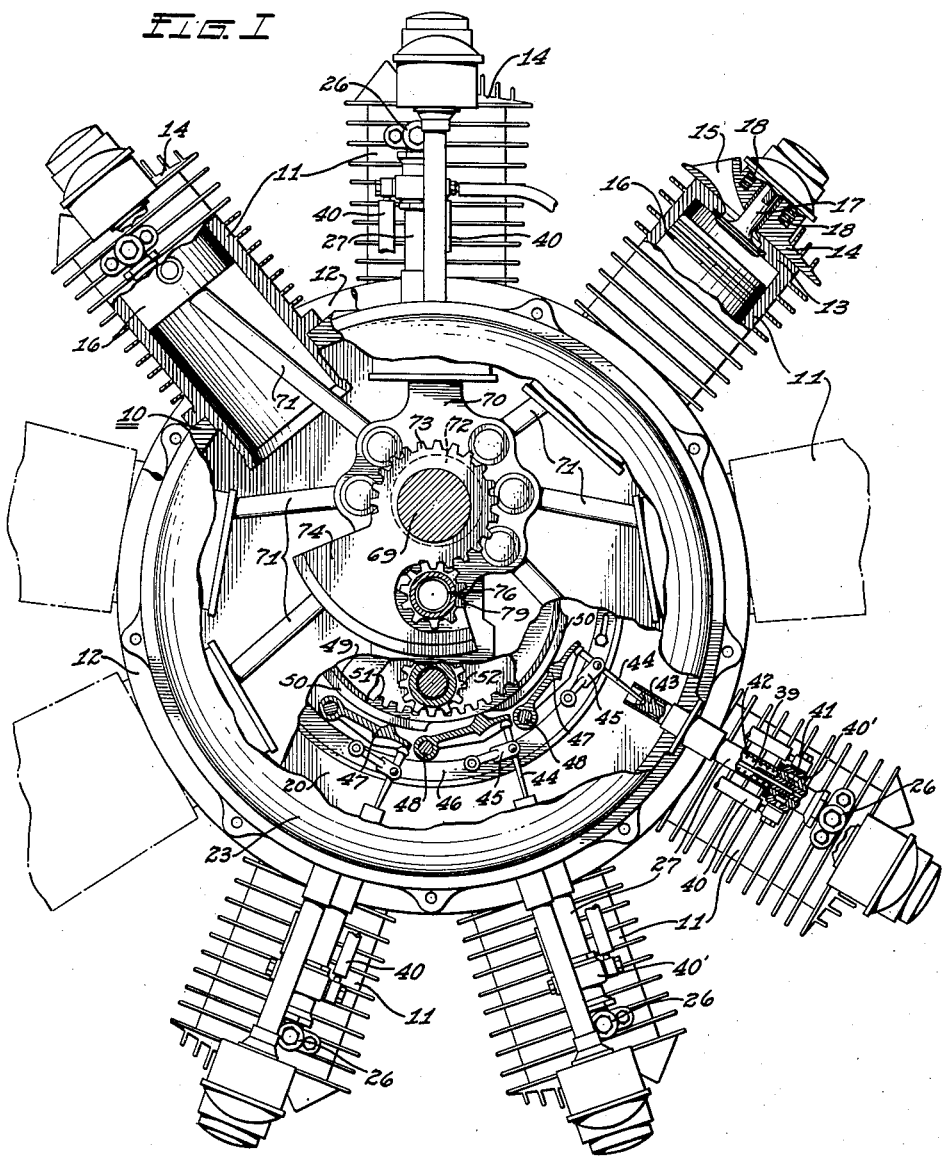
Inventor
HERBERT C. EDWARDS.
By [signature]
Attorney

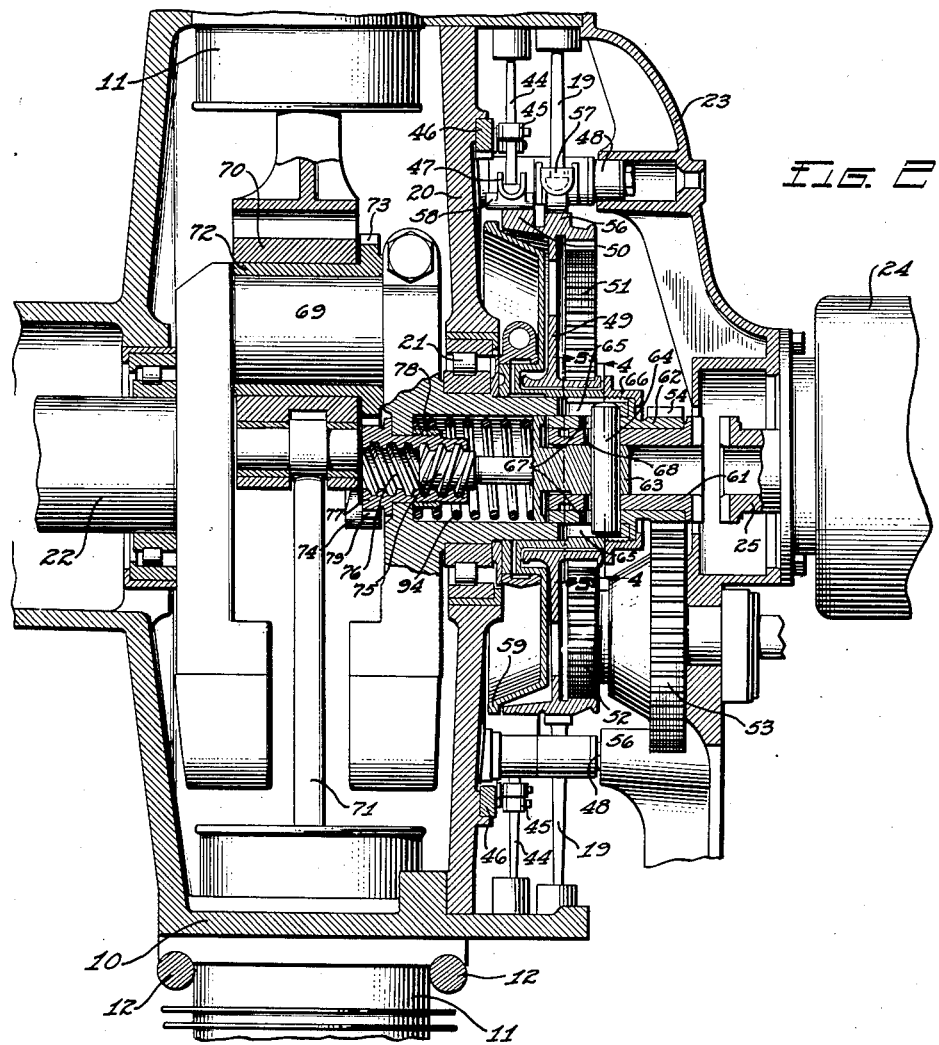
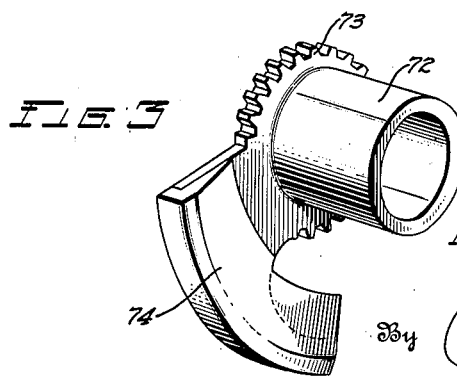

Aug. 29, 1933.     H. C. EDWARDS     1,924,843
INTERNAL COMBUSTION ENGINE
Filed Nov. 21, 1930     3 Sheets-Sheet 3
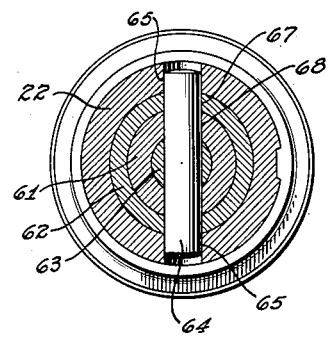
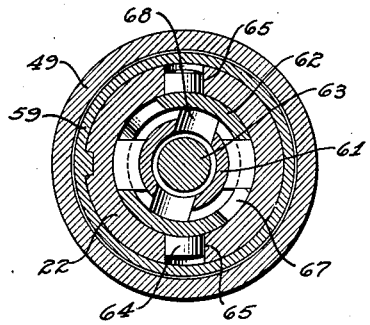
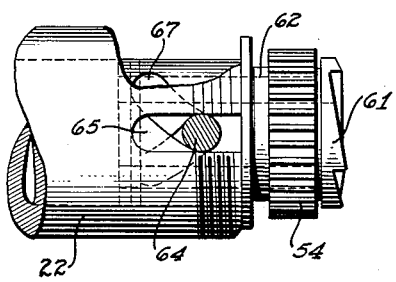
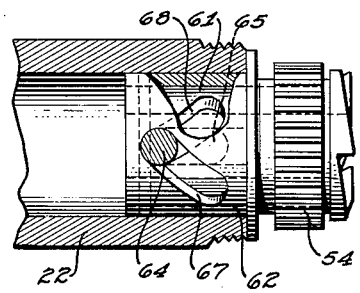
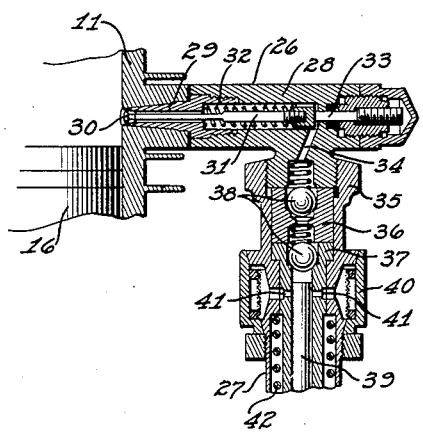
Inventor
HERBERT C. EDWARDS.

Patented Aug. 29, 1933

1,924,843

UNITED STATES PATENT OFFICE 1,924,843

INTERNAL COMBUSTION ENGINE

Herbert C. Edwards, Detroit, Mich., assignor to Packard Motor Car Company, Detroit, Mich., a corporation of Michigan Application November 21, 1930
Serial No. 497,220

14 Claims. (Cl. 123—179)

This invention relates to internal combustion engines and more particularly to engines of the compression-ignition type in which solid fuel is injected by pressure into compressed air charges in the combustion chambers.

One of the objects of the inventon is to provide an internal combustion engine in which the compression ratio is automatically raised while the engine is being cranked.

Another object of my invention is to provide an internal combustion engine which can be easily started under low temperature conditions without the use of auxiliary heating means.

A further object of my invention is to provide an internal combustion engine in which the compression ratio is controlled through the application of a starting means to the crank shaft.

Still another object of my invention is to provide a fuel injection type of compression-ignition engine in which the pressure behind the injected fuel is increased and the compression ratio is raised upon the application of a starting device so that starting can be readily accomplished under low temperature conditions without the use of auxiliary heating means.

These and other objects of the invention will appear from the following description taken in connection with the drawings, which form a part of this specification, and in which:

Fig. 1 is an end elevational view of an internal combustion engine having portions broken away and in section to show the compression ratio control means and the fuel injection mechanism with the eccentric in high compression ratio position;

Fig. 2 is a fragmentary vertical sectional view of the engine illustrating the details of the fuel and air valve actuating mechanisms and the compression ratio control means with the eccentric in low compression relation;

Fig. 3 is a perspective view of the eccentric bushing upon which the master rod hub is mounted;

Fig. 4 is a sectional view taken on line 4—4 of Fig. 2;

Fig. 5 is a sectional view taken on line 5—5 of Fig. 2;

Fig. 6 is a fragmentary view of the crank shaft and associated mechanism in a relation for regular running operation;

Fig. 7 is a similar view of the mechanism shown in Fig. 5 but arranged in starting position in which it is placed by the application of the starter;

Fig. 8 is a sectional fragmentary view of the injector mechanism showing one of the nozzles and a portion of the associated pump in detail.

Referring now to the drawings by characters of reference, 10 represents generally the crank case of a compression-ignition type of internal combustion engine from which a plurality of air-cooled cylinders 11 extend radially, the cylinders being secured in a compression relation against the outer wall of the crank case by a pair of compression rings 12. The cylinders are formed with an integral dome 13 and secured upon each of the domes is a head 14. Each of the associated heads and domes are formed with a single Venturi passage 15 leading into the interior of the associated cylinders, such passages serving as both the air inlet and exhaust outlet for the combustion chamber between the cylinder domes and the pistons 16 arranged within the cylinders. In order to control the passages 15, there is provided with each a valve 17 which is normally closed by a plurality of springs 18 and opened by mechanism including a push rod 19 which extends into the crank case.

A diaphragm, or internal reinforcing wall 20, is arranged within the crank case and is formed with a central opening in which is mounted a bearing 21 for supporting one end of the crank shaft 22 which extends axially through the crank case. Arranged in a substantially parallel relation to the diaphragm is a detachable rear end wall 23 which closes the open end of the crank case, and detachably secured to the rear wall is a starting device, indicated generally at 24, which is preferably of the inertia type as illustrated in Patent No. 1,739,469 of December 10, 1929 to R. P. Lansing. Such starting device is arranged with a reciprocable jaw 25 projecting into the crank case preferably in axial alignment with the rear end of the crank shaft section, so that it can be moved into a driving relation therewith.

The engine illustrated is of the compression-ignition or Diesel type and operates on a four-stroke cycle, air charges being drawn into the cylinders through the passages 15 upon the suction strokes of the pistons, during which time the valves 17 are open. The valves are next closed and the compression strokes occur. During the compression strokes, charges of liquid fuel are injected into the air being compressed at a high pressure and in an atomized condition such that the mixture thereof with the compressed air will form charges of a character which will be properly prepared for quick combustion. There is associated with each cylinder a fuel injection device which consists generally of a nozzle portion 26 and a pump portion 27, the nozzle portion being secured rigidly to the cylinder and arranged to project through the wall thereof so that the fuel charges can be injected directly into the combustion chambers which are in the cylinders.

Each nozzle consists of a barrel 28 having a detachable end 29 extending through the cylinder wall and formed with a conical outlet opening in which the valve 30 is mounted. The valve stem 31 is connected to the valve 30 and is arranged to be moved into engagement with the stop member 33 by the spring 32, and such stop member is adjusted to prevent the valve head 30 from engaging the surrounding wall. The barrel 28 is formed with a laterally extending neck portion provided with a passage 34 leading to the hollow chamber in the barrel through which the valve stem extends. Such nozzle neck is screwed into the case 35 of the associated pump unit and bears against a ring spacer 36 which maintains the pump barrel 37 in position within the casing 35, there being a pair of spring-pressed valves 38 associated with the ring member and barrel to prevent liquid fuel from returning to the pump structure from the nozzle structure. A plunger 39 is arranged to reciprocate within the pump barrel and a fuel inlet manifold 40 leads to all the pumps, there being unions 40' in the manifold structure associated one with each of the barrels; and ports 41 extend through the casing and the barrel to establish communication between the fuel feeding manifold and the interior of the barrel.

The ports 41 are controlled by the position of the plungers so that when the plungers uncover the ports 41, liquid fuel is moved into the pump barrels and nozzles to completely fill the chambered portion thereof. The pump plungers are moved in their injection strokes by mechanism which will be hereinafter described, and during such movement they close the ports 41; their strokes after closing such ports determine the quantity of the fuel which is displaced from the nozzles and injected into the cylinders. It will be seen that the speed of the movement of such plungers determines the amount of pressure behind the fuel, assuming that the tension of the springs 32 is predetermined and not adjustable. The effective strokes of the plungers force fuel oil from the nozzles past the valve heads 30 in a manner such that the fuel charges are directed into the cylinders in a conical-shaped spray. The air inlet passages are formed and arranged so that they cause rotation of the air in the cylinders and such rotation continues during the following compression stroke of the pistons, the fuel charges being sprayed into such compressed rotating air charges in which the degree of fuel atomization and the amount of the pressure at which it is injected determines the extent of the intermingling of the oil and air and, therefore, it is necessary that there be sufficient injection penetration of the oil and atomization thereof to cause a uniform distribution of the fuel in the compressed air charges if efficient engine operation is to result. It is also necessary that the atomization and penetration be of a certain character if combustion is to be obtained when the cylinders are cold, as they are when starting. With the type of injection mechanism described which is operated in accordance with the crank shaft speed, there is difficulty experienced when starting the engine to produce a sufficient pressure behind the fuel charges through the normal slow movement of the fuel pumps to cause sufficient atomization and penetration to produce a mixture which will be properly mixed so as to result in combustion.

In order that the pressure behind the fuel charges may be materially increased over that developed by the mechanism effective when the engine is running under its own power, I provide an auxiliary actuating mechanism for the injection mechanism which is effective only during the application of the starter mechanism for turning the crank shaft. This auxiliary actuating mechanism is made effective automatically through the association of the starting device with the crank shaft, and is automatically caused to be ineffective when the starting device is released from driving relation with the crank shaft.

Under normal running operation, crank shaft actuated mechanism is provided for causing the pump plungers to move in their injection strokes and such mechanism is returned by coil springs 42 to a position causing uncovering of the ports 41. A fuel plunger push rod guide 43 extends through the crank case and has associated therewith a rod 44 which is pivotally connected with a link 45 carried by a regulating ring 46 arranged within the crank case. The ring can be regulated through the association therewith of any suitable mechanism projecting through the crank case. Associated with each of the rods 44 is a slipper or rock lever as shown at 47, each being carried by a shaft 48 supported by the diaphragm and a rear casing cover 23. The free end of the rock levers is formed with a curved groove in which the associated rod 44 is adjustably positioned by means of the ring 46 and the connecting links 45 so that upon movement of the members 44 lengthwise of the slippers, the effective stroke of the pump plungers can be simultaneously adjusted. Arranged interiorly of the space bounded by the pivoted slippers or rock levers 47, for actuating the same to cause an injection stroke of the pump plungers, is a cam 49 which is provided with four lobes 50; such cam is provided with an internal gear 51 with which gear 52 meshes, such gear being mounted integrally on the same shaft with the gear 53 which is arranged adjacent the end wall of the casing 23. Meshing with the gear 53 is a gear 54 which is driven with and at crank shaft speed. This arrangement of gearing which is described is related so that rotation of the crank shaft will cause rotation of the cam 49 in an opposite direction to the rotation of the crank shaft and at one-eighth the speed thereof. The rotation of the cam 49 is such that upon each two revolutions of the crank shaft, the lobes 50 will cause one actuation of each of the nine slippers associated with the nine fuel injection devices. The cam 49 is also provided with a series of lobes 56 for actuating the slippers 57 mounted on the shafts 48, with which the valve push rods 19 are associated so that during the suction strokes of the pistons the valve are thus held open.

As before stated, I have found that with the fuel injection mechanism described sufficient penetration of the compressed air charges and a desirable atomization of the fuel is attained during running operation to result in combustion by compression suitable for efficient operation, but when the crank shaft is being turned by an auxiliary source of supply, such as the starting device, the rotation is so slow that the resulting action of the fuel injection mechanism will not cause sufficient pressure to be exerted against the fuel charges to cause the necessary penetration of the air charges and the proper atomization to support combustion. In order to secure this necessary fuel pressure and atomization and to inject the charges at a time during the compression stroke when the best efficiency will result, I provide an auxiliary mechanism for actuating the slippers which are associated with each of the injection devices; the fuel mechanism slippers 47 are provided with an extended portion 58 so that they can be actuated by a single lobe cam 59 which is keyed to and driven by the crank shaft when the starting device is in operative association with the crank shaft. This cam 59, running at crank shaft speed, will move eight times as fast as the regular fuel actuating cam 49 and consequently will cause a faster stroke of the pump plungers, thus resulting in a much increased pressure and atomization over that which would be attained with the cam 49 at such crank shaft rotation. In addition, the cam 59 is preferably arranged to cause fuel injections just shortly before the pistons reach the top of their compression strokes while the cam 49 is preferably arranged so that the fuel injections will be caused between a range of forty to twenty degrees of the crank shaft rotation prior to the time that the pistons reach the top of their compression strokes. I have found that when starting, this delay in the timing and the provision of a pressure behind the fuel charge will cause a substantial penetration thereby of the compressed air charges and in a well atomized condition, thus materially assisting in the starting of engines of the character described as very little turning of the crank shaft is required to cause combustion.

A single throw crank shaft 22 extends axially through the crank case and at its rear end terminates in an extension 61 having an end jaw with which the jaw 25 of the starter is arranged to cooperate. The crank shaft is provided with a hollow rear end into which the extension 61 projects, and a sleeve member 62 also projects into the hollow end of the crank shaft and telescopes the shaft extension 61. The shaft extension is formed as a sleeve and the reduced end of a plunger element 63 extends into the forward end thereof. The plunger has a sliding fit within the hollow end of the crank shaft 22, and there is a coil spring 94 in the hollow end of the crank shaft which bears against the plunger 63. A driving pin 64 extends transversely through the plunger, the shaft extension and the sleeve and projects into oppositely disposed slots 65 which extend axially in the main crank shaft. The sleeve 62 is provided with oppositely disposed slots 67 which extend at an angle axially thereof while the crank shaft extension 61 is also formed with oppositely disposed slots 68 which extend at an angle to the axis thereof but in an opposite direction to that in which the slots in the sleeve 62 extend, and the pin 64 projects through such slots. The cam 49 telescopes a hub portion of the cam 59 and such cams and the sleeve 62 are secured axially by the nut 66 which is screwed upon the end of the main section of the crank shaft.

As shown in Figs. 2 and 6, the driving pin 64 is held at the rear end of the slots in the shaft extension and the sleeve because of the spring pressure exerted against the plunger 63 through which the driving pin extends.

When the engine is being started and the starter jaw 25 has been moved into engagement with the jaws on the end of the shaft extension 61, initial rotation of the starter will cause the shaft extension to rotate therewith which will move the pin 64 forwardly in the slots 65 of the main portion of the crank shaft and without rotation thereof until the pin has reached the rear end of the slots 68 whereupon the main section of the crank shaft is rotated with the crank shaft extension. During the time that the pin is traveling forwardly in the slots 65, the sleeve 62 will be turned in a reverse direction the same degree as the crank shaft extension turns before the main section of the crank shaft is driven, and in so doing the gear 54 is rotated and through the associated train of gears the cam 49 is likewise rotated. This rotation of the cam 49 moves it into a position where the lobes are effective in their rotation after the lobe on the cam 59 has raised the rock levers 47, and as the lobe on the cam 59 is of a length to hold the rock levers raised while the cam lobes 50 first pass thereunder, the cam 49 will thus be made ineffective, and likewise when the starter is not applied to the crank shaft the lobes 50 of the cam 49 will actuate the rock levers 47 and will hold them raised while the lobe of the cam 59 is passing thereunder.

It will be understood that the cam 59 is arranged upon the crank shaft so that its lobe will actuate the rock levers 47 at just a few degrees before the pistons reach the top of their compression stroke, whereas the cam lobes 50, when effective, will actuate the rock levers 47 within a range extending between forty and twenty degrees of crank shaft rotation before the pistons reach the top of their compression strokes. When the starter is released from the crank shaft extension the spring 94 will move the plunger 63 rearwardly and it carries the pin 64 therewith so that in this manner the crank shaft extension 61 and the sleeve 62 are rotated so that the lobes 50 are placed in effective position with respect to the slippers 47. With this dual form of actuating means for the slippers 47 I am able to secure fast enough movement of the pump plungers when the engine is running under its own power through means of the lobes 50 to produce atomization of the oil charges and sufficient penetration thereby of the compression air charges in the cylinders to result in a commingled mixture which will readily ignite through compression, and likewise when the crank shaft is being turned over slowly in starting, the single lobe cam is effective and will give a much faster movement to the pump plungers than the running cam would so that under such circumstances the oil charges are atomized and projected into the air charges in a manner causing a commingling such that ignition will readily take place through compression.

The main section of the crank shaft is made in two parts, the forward part terminating in the crank pin 69 and the rear part being clamped upon the end of the crank pin. The shaft is formed in this manner so that it can be readily assembled with the master rod hub 70 from which the connecting rods 71 extend to the pistons 16 in the cylinders. An eccentric sleeve 72 is rotatably mounted upon the crank pin 69 and provides a bearing for the master rod hub 70. This sleeve is formed with a flanged end upon which is formed a gear sector 73 and to which is secured a counterweight 74. The eccentric sleeve or bushing is rotatably mounted upon the crank shaft and is automatically moved or held in position by mechanism which is actuated simultaneously with the movement of the cam 49. Rotation of the eccentric sleeve will change the stroke of the connecting rods and pistons in the cylinders so that there will be a variable compression ratio, and it is the main purpose of this invention to change the compression ratio so that it will be high when starting and low when the engine is running under its own power, and to this end I provide a connection between the cam driving and adjusting mechanism and the bearing.

The plunger 63 is formed with an extension which terminates at its forward end in the worm gear 75, and such gear meshes with a similarly formed internal gear 76 arranged interiorly of the sleeve 77 which extends through the rear cheek of the crank shaft and is secured axially thereto by means of nuts 78. Upon the forward end of the sleeve 77 is a gear 79 which is arranged to mesh with the gear sector 73 on the flanged end of the eccentric bushing. As the plunger 63 is moved axially through the initial rotation of the crank shaft extension 61 and during its return to normal position, the sleeve 77 will be rotated through the gears 75 and 76, and through the gear 79 will cause rotation of the eccentric bushing relative to the crank shaft. The eccentric bushing is formed and arranged so that the master rod hub will be associated with the crank shaft in a manner to cause high compression ratio during application of the starter at which time the plunger member 63 is in its forward position, and low compression ratio when the plunger member is moved to its rearmost position at which time the starter is ineffective.

It will be seen that I have provided automatic mechanism for causing a high compression ratio simultaneously with the application of the starter and during the effectiveness of the fast cam 59, and that when the cam 49 is effective to actuate the fuel pumps then the compression ratio is lowest. It will be readily understood that in starting a cold Diesel engine, high compression ratio is a decided advantage because the charges are compressed to a greater degree and will thus produce a higher temperature and a consequent quicker combustion than would otherwise result. This application of high compression ratio and the increase of the pressure behind the fuel injections during application of the starter result in easy starting of a Diesel or solid oil injection type of internal combustion engine, and with such an arrangement the use of auxiliary heat to assist in the securing of combustion is dispensed with unless extremely low temperatures are encountered.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

What I claim is:

1. In an internal combustion engine, the combination of compression ratio controlling mechanism, a starter, and means operated by and during application of the starter and connected to actuate said mechanism to change the compression ratio.

2. In an internal combustion engine, the combination of compression ratio controlling mechanism, a starter, and means connected to automatically adjust said mechanism during application of the starter to increase the compression ratio, said means being actuated by said starter.

3. In an internal combustion engine, the combination of mechanism controlling the piston strokes, a starter, and means connected to adjust the mechanism, said means being actuated by and during application of the starter to vary the piston strokes in a manner increasing the compression ratio.

4. In an internal combustion engine, the combination of a crank shaft, compression ratio controlling mechanism, a starter, and means connected to shift the mechanism, said means being actuated by the application of the starter to the crank shaft and shifting the mechanism to increase the compression ratio.

5. In an internal combustion engine, a crank shaft having sections relatively rotatable a limited degree, a starter engageable with one of the crank shaft sections, compression ratio changing mechanism, and means connecting the compression ratio changing mechanism and the section of the crank shaft with which the starter engages, application of the starter to the crank shaft section moving the mechanism to a high compression ratio position.

6. In an internal combustion engine, a crank shaft having an end section, said end section being rotatably associated with the crank shaft a limited degree, compression ratio controlling mechanism, and connecting means between the end section and the control mechanism, the rotation of the end section relative to the crank shaft actuating the controlling mechanism to vary the compression ratio.

7. In an internal combustion engine, a crank shaft having an end section rotatable a limited degree relative thereto, a starter adapted to be applied to the end section, compression ratio control mechanism, and means connecting the shaft end section and the control mechanism, the rotation of the shaft end section by the starter upon application thereto causing the connecting means to shift the controlling mechanism to increase the compression ratio.

8. In a radial internal combustion engine, a crank shaft having a jaw end section to which the starter is applied and rotatable a limited extent relative to the other portion of the crank shaft, an eccentric bearing on the crank shaft, a connecting rod structure mounted on the bearing, and mechanism connecting the bearing with the jaw end section of the crank shaft to rotate in unison therewith.

9. In an internal combustion engine, compression ratio control mechanism, means for actuating fuel injection pumps at two speeds relative to the engine speed, means normally maintaining the compression ratio control mechanism in its lowest compression ratio position and the fuel pump actuating means in the slower speed relation, a starter, and means connecting the starter with the compression ratio control mechanism and with the actuating means for the pump to shift the mechanism to a high compression ratio position and the means to a high speed relation.

10. In an internal combustion engine of the radial type, a crank shaft having a jaw end section rotatable a limited extent relative thereto by the application of a starter, an eccentric bearing on the crank shaft, said eccentric bearing having a gear sector integral therewith, a master rod hub mounted upon the eccentric bearing, and connecting control mechanism intermediate the relatively rotatable shaft section and the eccentric bushing including a gear meshing with the gear sector, the rotation of the shaft end section relative to the shaft actuating the control mechanism and turning the eccentric bearing to vary the compression ratio.

11. In an internal combustion engine of the radial type, a crank shaft having an end section rotatable a limited extent relative thereto, a cam for actuating a fuel injection pump, means connecting the cam with the crank shaft end section to rotate therewith relative to the crank shaft, an eccentric bearing for varying the compression ratio, and a connection between said means and said eccentric whereby they rotate substantially in unison.

12. In an internal combustion engine, compression ratio control mechanism, means for actuating fuel injection pumps at two speeds relative to the engine speed, spring means normally maintaining the compression ratio control mechanism in position to cause the lowest compression ratio and the fuel pump actuating means in the lower speed relation, a starter, and means connected to the compression ratio control mechanism and to the means for actuating the pumps, said connection means being actuated upon application of the starter to the engine whereby shifting the compression ratio control mechanism to produce the highest compression ratio and the fuel pump actuating means in its higher speed relation.

13. In a radial internal combustion engine, a crank shaft having an end section relatively rotatable a limited degree, an eccentric bearing on the main portion of the crank shaft, a master rod hub mounted on the bearing, means connecting the eccentric and the crank shaft end to move in unison, said means including gearing for rotating the eccentric and a shaft movable axially in the crank shaft, and a starter for application to the crank shaft end section.

14. In a radial internal combustion engine, a crank shaft having an end section rotatable a limited degree relative thereto, a cam for actuating a fuel pressure injection mechanism, reduction gearing intermediate the cam and the crank shaft end section, an eccentric bearing on the crank shaft, a master rod hub on the bearing, and a connection between the bearing and the shaft end section, the application of the starter to the end section of the shaft rotating the bearing therewith to shift the hub position in a direction relative to the crank shaft to raise the compression ratio.

HERBERT C. EDWARDS.